(12) United States Patent
Gerakoulis et al.

(10) Patent No.: US 7,995,453 B2
(45) Date of Patent: *Aug. 9, 2011

(54) ORTHOGONAL CODE DIVISION MULTIPLEXING FOR TWISTED PAIR CHANNELS

(75) Inventors: Diakoumis Parissis Gerakoulis, Dover, NJ (US); Evaggelos Geraniotis, Potomac, MD (US)

(73) Assignee: AT&T Intellectual Property II, LP

( * ) Notice: Subject to any disclaimer, the term of this patent is extended or adjusted under 35 U.S.C. 154(b) by 0 days.

This patent is subject to a terminal disclaimer.

(21) Appl. No.: 12/648,431

(22) Filed: Dec. 29, 2009

(65) Prior Publication Data

US 2010/0150211 A1  Jun. 17, 2010

Related U.S. Application Data

(63) Continuation of application No. 10/832,762, filed on Apr. 27, 2004, now Pat. No. 7,672,218, which is a continuation of application No. 09/413,162, filed on Oct. 6, 1999, now Pat. No. 6,711,121.

(51) Int. Cl.
*H04J 11/00* (2006.01)
*H03K 7/02* (2006.01)
*H03K 9/02* (2006.01)

(52) U.S. Cl. .......................... 370/203; 370/208; 375/353

(58) Field of Classification Search ........................ None
See application file for complete search history.

(56) References Cited

U.S. PATENT DOCUMENTS

| 5,991,308 A * | 11/1999 | Fuhrmann et al. ....... 370/395.53 |
| 6,018,547 A * | 1/2000 | Arkhipkin et al. ............ 375/133 |
| 6,075,781 A * | 6/2000 | Ohlson et al. ................ 370/342 |
| 6,222,828 B1 * | 4/2001 | Ohlson et al. ................ 370/320 |

* cited by examiner

*Primary Examiner* — Chirag G Shah
*Assistant Examiner* — Ashley L Shivers

(57) ABSTRACT

A plurality of data signals are separated into parallel bit streams with each parallel stream having a bandwidth characteristic such that the combined cumulative effect of all the individual bandwidths produces a spectral characteristic of the data signals that match the spectral high speed data characteristic of a twisted pair.

18 Claims, 9 Drawing Sheets

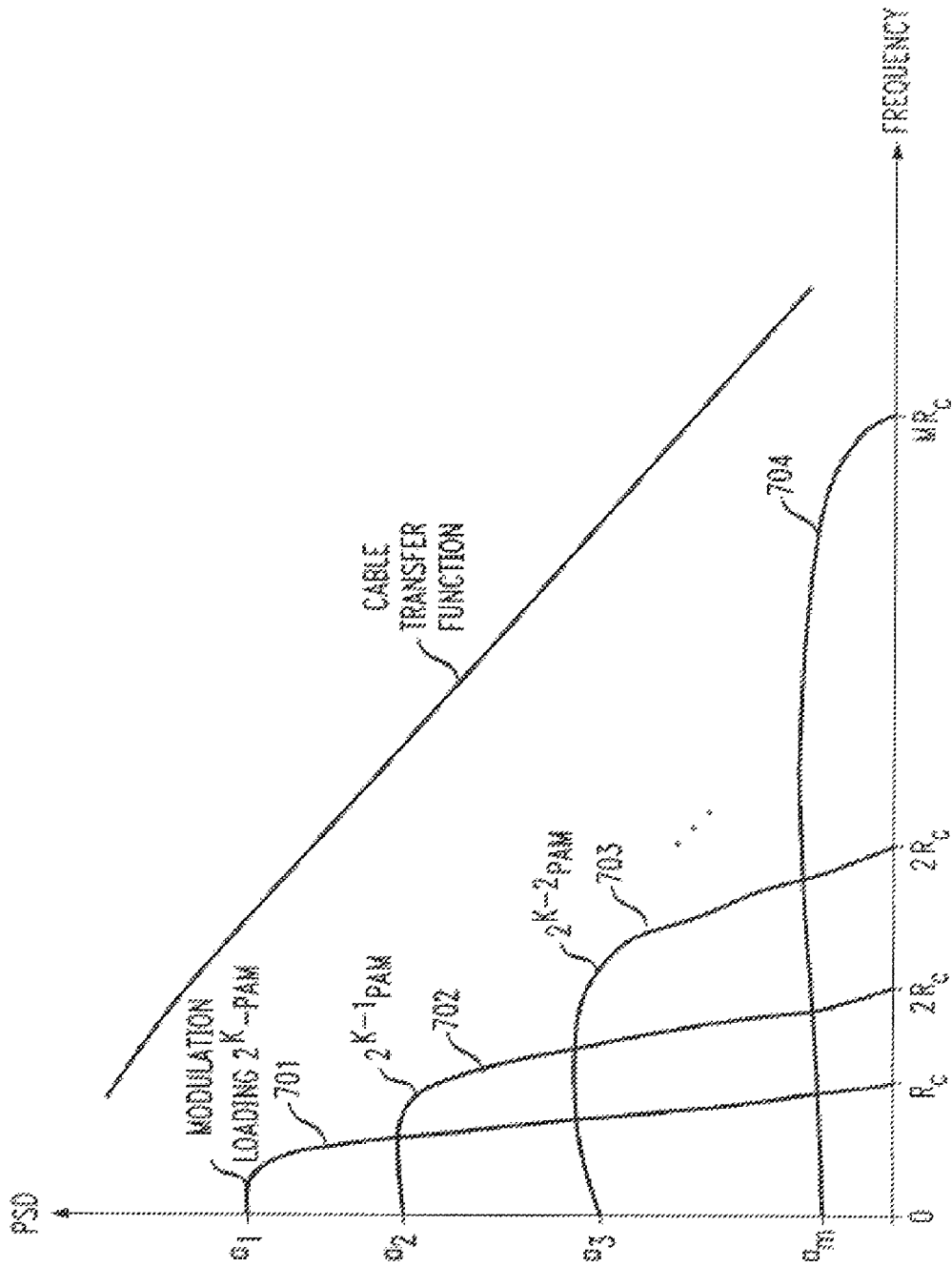

ORTHOGONAL CODE DIVISION MULTIPLEXING FOR TWISTED PAIR CHANNELS

RELATED APPLICATIONS

This application is a continuation of U.S. application Ser. No. 10/832,762 filed in the United States Patent Office on Apr. 27, 2004, which now beard U.S. Pat. No. 7,672,218, which Patent is a continuation of U.S. application Ser. No. 09/413,162 filed Oct. 6, 1999 which now bears U.S. Pat. No. 6,711,121.

FIELD OF THE INVENTION

This invention relates to high-speed data transmission over a twisted pair local access connection. It is specifically concerned with matching of power spectra density of a high rate data channel with a transfer function of a twisted pair.

BACKGROUND OF THE INVENTION

High-speed data transmission over a twisted pair (i.e., subscriber local access line) such as HDSL, as it is presently carried out, uses transmission procedures full of complexity. Such complexities include multicarrier modulation, multitone transmission and orthogonal frequency division. These processes are all susceptible to external interference and to crosstalk.

Transmission of signal s(t) in a Twisted pair is subject to various types of interference including near end crosstalk (NEXT), which affects high speed data transmission. Multiple channels may be transmitted over a single twisted pair, but may interfere with one another. Twisted pair channels must be substantially orthogonal to one another in order to limit interference between channels.

A functional diagram of these interferences is shown in the FIG. 1A, where an input lead 101 represents application of the data signal s(t) to the twisted pair. The twisted pair may be characterized by a transfer function that is related to the absolute square of the functional value $H_c(f)$, which represents an attenuation characteristic at the twisted pair, and is proportional to $\sqrt{f}$. In addition, there is significant interference from NEXT, represented by $H_a(f)$. Far end crosstalk, FEXT, is relatively very low compared to NEXT and is not included in the model.

The input and the NEXT are applied to mixer 107 that represents the interaction of the signals. The output on lead 109 represents the amalgam of the data signal plus the interference signals.

The effect of this interference of the twisted wire attenuation of signals is shown by the graph of FIG. 1B where coordinate axis 100 of the log of signal frequency is plotted against a coordinate axis 102 representing attenuation in dB.

Curve 111 represents the attenuation of the data signal as function of frequency. Curve 113 represents the increase of NEXT as frequency increases. It is apparent that as the data signal attenuates with increasing frequency, and the interference signal increases with the increasing frequency. NEXT is a dominant portion of this interference. Other forms of interference include narrow band radio interference. All these interferences contribute to the frequency limits of the twisted pair. In a typical instance 95% of twisted wire capacity is below 10 kHZ and 60% of capacity is below 40 kHZ.

SUMMARY OF THE INVENTION

A plurality of data signals are separated into parallel bit streams, with each parallel stream having a bandwidth characteristic such that the combined cumulative effect of all the signals with individual bandwidths produce spectral characteristics of the data signals that can accommodate and emulate the spectral high speed data transmission characteristic of a twisted pair.

In a particular embodiment parallel data streams resulting from a serial to parallel conversion of an input data stream and multiplexing into a number of parallel symbol streams, including data transmitted at different data rates are each individually spread to a different bandwidth so that the combined effect of the selected bandwidths has a spectral distribution resembling the spectral transmission characteristic of a twisted pair.

A proposed embodiment based on Orthogonal Code Division Multiplexing (OCDM) performs two essential steps: (1) performing a serial to parallel conversion of a serial input into a plurality of orthogonal serial streams each having different chip rates, and (2) loading of each of the paralleled streams by adaptive modulation. These two steps are combined with spreading code generation techniques to achieve high-speed data transfer over twisted pair.

Each individual paralleled stream is spread to a different bandwidth, with the narrowest bandwidth having the highest modulation loading and the broadest bandwidth having the lowest modulation loading. The selected modulation technique in one embodiment is pulse amplitude modulation with no carrier. Adaptive loading of the signal streams (loading refers to a matrix dimensionality of a modulating signal) is selected and applied to distribute the power spectra so that it matches the twisted pair transfer function. Each stream may represent different services.

Fundamentally the concepts of the OCDM scheme are a serial-to-parallel conversion (i.e., multi-codes) and over-spreading (i.e., spectral matching). An input data stream is serial-to-parallel converted to parallel branches. Each branch is transmitted with spreading orthogonal codes applied. The number of parallel branches N is equal to the spreading gain of these orthogonal codes. Spectral matching to the channel is preceded by an overspreading of the chips of the spreading orthogonal code. Overspreading is recursive with a (+,-) pattern. Different powers are assigned to different levels. Different levels of overspreading are orthogonal to each other. Serial-to-parallel codes may be reused in spreading and overspreading in different channels of overspreading according to a spectral matching desired.

An advantage of the coding scheme is that it is effective in rejecting radio interference even with unshielded twisted pair.

BRIEF DESCRIPTION OF THE DRAWING

FIG. 7 is a graph of power spectral density for the OCDMs using adaptive loading of modulation and compared with the power spectra characteristic of a twisted pair.

DETAILED DESCRIPTION

Figure 1A:
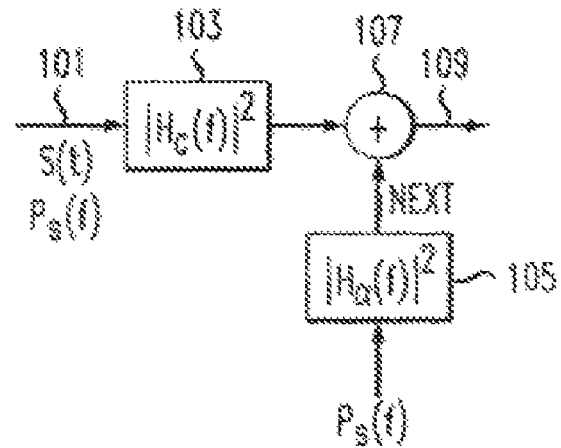
FIG. 1A is a functional block schematic of a twisted pair channel subject to interference including near end crosstalk (NEXT)
Figure 1B:
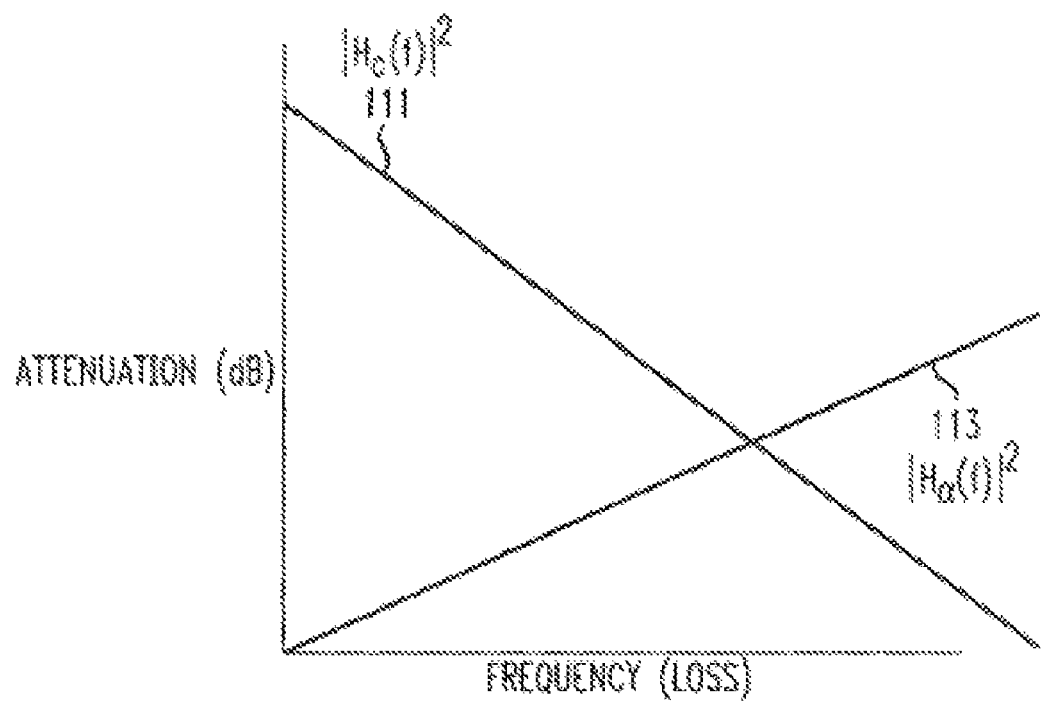
FIG. 1B is a graph of the frequency and attenuation response of the twisted pair channel functionally shown in FIG. 1A.

In accord with the principles disclosed herein, data transmissions are distributed by frequency so that the highest data load is at lower frequencies, where the capacity is high, and the lowest data load is transmitted at high frequencies. Orthogonal Code Division Multiplexing (OCDM) is utilized to achieve this objective. Existing low bit rate services are multiplexed with high data rate T1 service. In a particular embodiment the OCDM is a carrier-less baseband system with adaptive pulse amplitude modulation (PAM) loading.

The drawing and text uses various symbols in the various descriptions. These symbols are as follows:

W: the overall Twisted Pair Channel (TPC) useful bandwidth;

$R_c$: The basic chip rate;

M: The total number of baseband sub-rate OCDM components (groups of branches) set to match power spectral density of the channel;

$R_c, 2R_c, 4R_c, \ldots 2^{M-1}R_c$ are chip rates used by M groups of OCDM with the relationship between basic chip rate and total OCDM bandwidth as:

$$R_c = \frac{2W}{2^{M-1}}$$

N: processing gain associated with the basic chip rate; also the number of OCDM parallel data streams and of orthogonal codes used.

$N_1, N_2, \ldots N_M$: numbering of parallel data streams out of N used in each branch.

$N_m$ corresponds to a group of branches m whose signal has a chip rate and bandwidth $2^{(m-1)}$ for m=1, 2, ..., M $L_m$ is a measure of the order of data modulation (i.e., loading): represents the total number of symbols used;

$I_m = \log_2 L_m$ represents the number of bits per $L_m$-PAN symbol. $L_m$-PAN is used by all $N_M$ data streams or branch m.

Figure 2A:
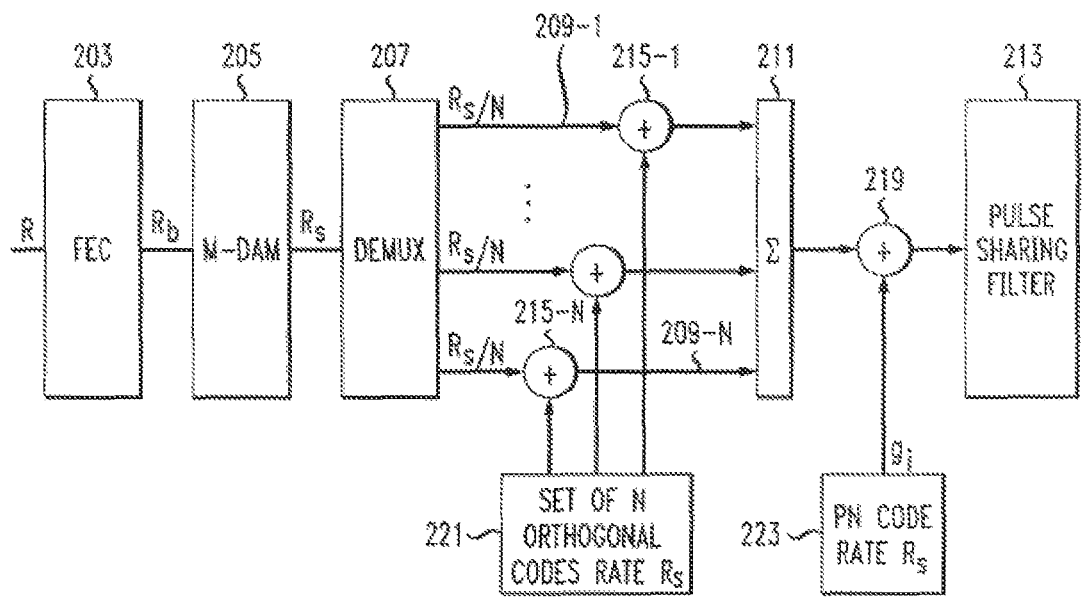
FIG. 2A is a block schematic of an orthogonal coded transmitting processing circuit for optimizing data rates and applying signals to a twisted pair channel.

FIG. 2A shows the circuitry used for conditioning signals for transmission over a twisted pair. An incoming symbol stream of rate R is applied to lead 201. Its output, at rate $R_b$, is applied to a M-PAM pulse amplitude modulator 205. Modulator 205 maps the FEC output into k-bit blocks, or symbols, and converts each symbol into a signal level, resulting in a stream of pulses each having a level ranging between 0 and M−1, where M=$2^k$. The M-PAM modulator in this embodiment operates at base band and is carrierless.

The M-PAM pulses, having the rate $R_s$, are demultiplexed by demultiplexer 207 into N paralleled streams, each having a rate $R_s/N$, with the signal content of each stream being spread by one of N orthogonal codes $H_i$ where i=1, ... N (developed in block 221) having a rate $R_s$ in mixers 215-1, ..., 215-N. Codes $H_i$ spread all of the parallel streams to a common rate $R_s$. The resulting paralleled streams 209-N are summed in summing circuitry 211. The combined signal is cover coded, in mixer 219, with a PN code (provided by block 223) and applied to a pulse-shaping filter 213 to shape output pulses so that its power spectral density (PSD) approximates that obtained from a water pouring solution. Water pouring is a concept used in the science of information theory.

If all data sources are linked or co-located, the system does not require system synchronization of the symbol streams. If the symbol sources arise from widely separated source locations, the twisted pair channels (TPC) will be asynchronous, leading to increased interference. Interference between channels may still be reduced by application of the PN cover code. Interference is reduced by a factor of $R_o/N$ where $R_o$ is the symbol rate in another TPC (i.e., twisted pair channels).

Figure 2B:
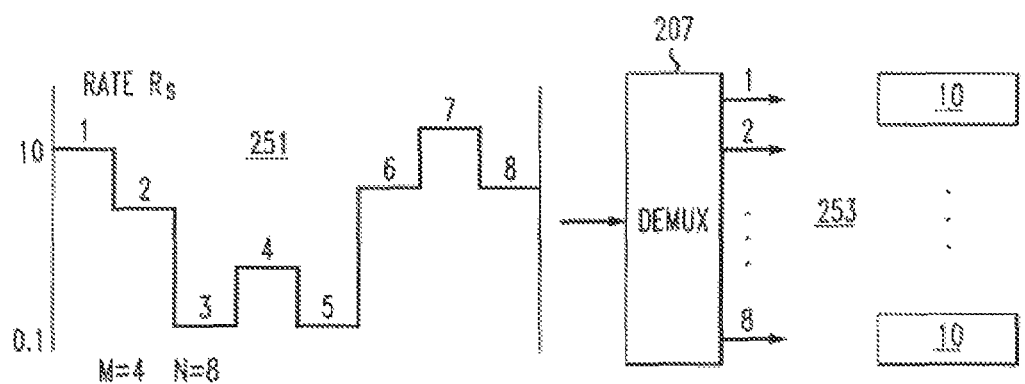
FIG. 2B presents graphs that compare input and output rates of the processing circuit of FIG. 2A.

The graphical displays of FIG. 2B illustrate typical differing code rates as a step function 251 showing different code rates 1 through 8. These code rates are demultiplexed into 8 parallel symbol streams 253 at a rate $R_s$.

It may be noted that the modulating codes $H_m$ are typically multi-dimensional (i.e., matrices of multiple dimensions). In the illustrative embodiment overspreading is performed using all available orthogonal codes so that usage of the codes is complete. This improves spectral matching with the twisted pair.

Figure 3:
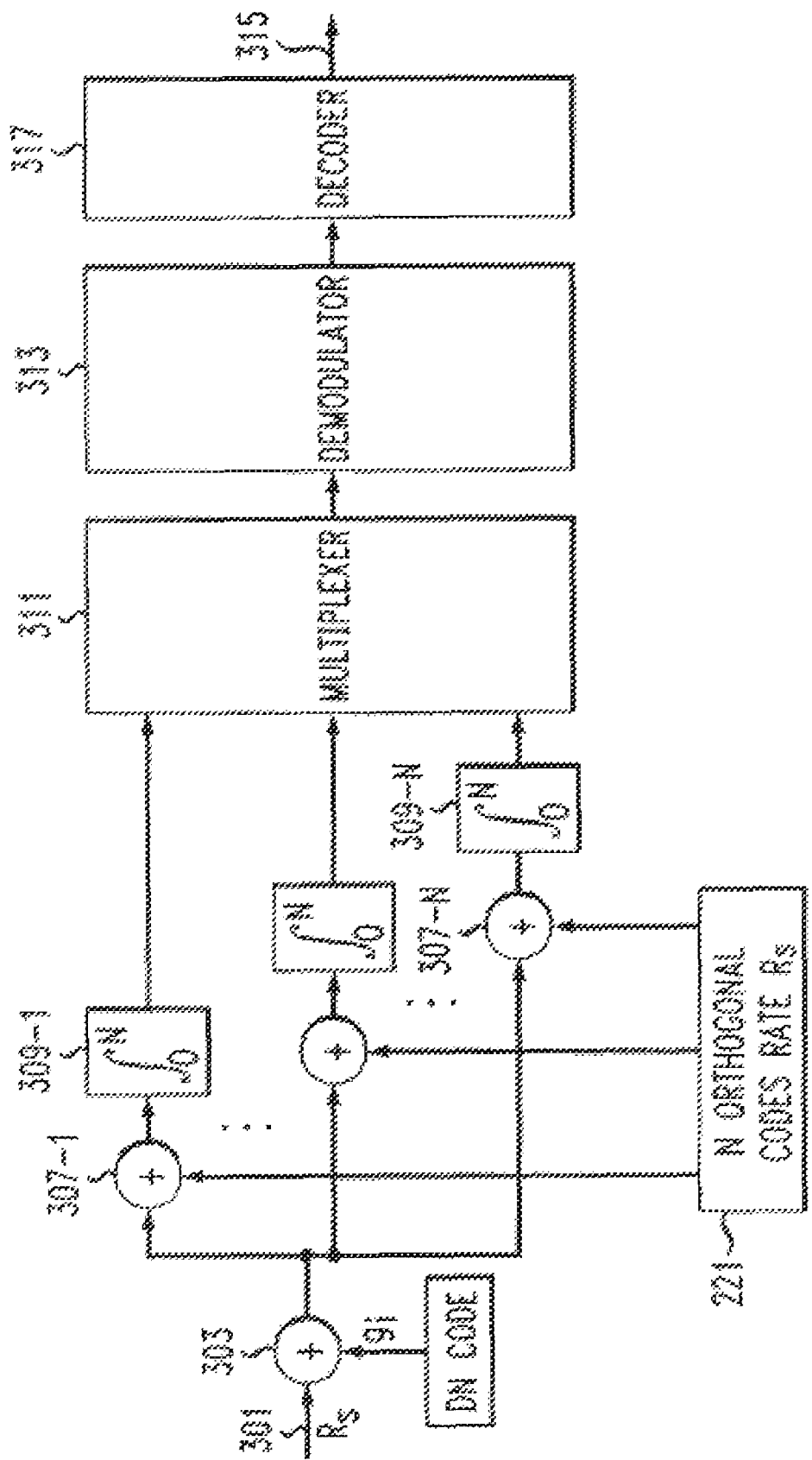
FIG. 3 is a block schematic a receiving terminal for receiving OCDM transmissions from a transmitter such as shown in FIG. 2A.

Signal reception requires an OCDM receiver to recover the individual signals at a termination of the twisted pair. In an OCDM receiver shown in FIG. 3 the received OCDM signal at lead 301 is covered by applying a PN code $g_i$ at mixer 303 in order to achieve a desired power spectra distribution of the received signal. The covered signal $R_s$ is applied to mixers 307-1, ..., 307-N. The mixers in response to an applied despreading code and in combination with subsequent associated accumulators 309-1, ..., 309-N recover the original CDMA signal. The output $R_s/N$ of each accumulator is applied to a multiplexer 311, which recovers the input signal $R_s$, and the signal is subsequently demodulated in demodulator 313. The demodulated signal is applied to a decoder 317, which decodes the FEC coding and a final output is applied to output lead 315.

Figure 4:
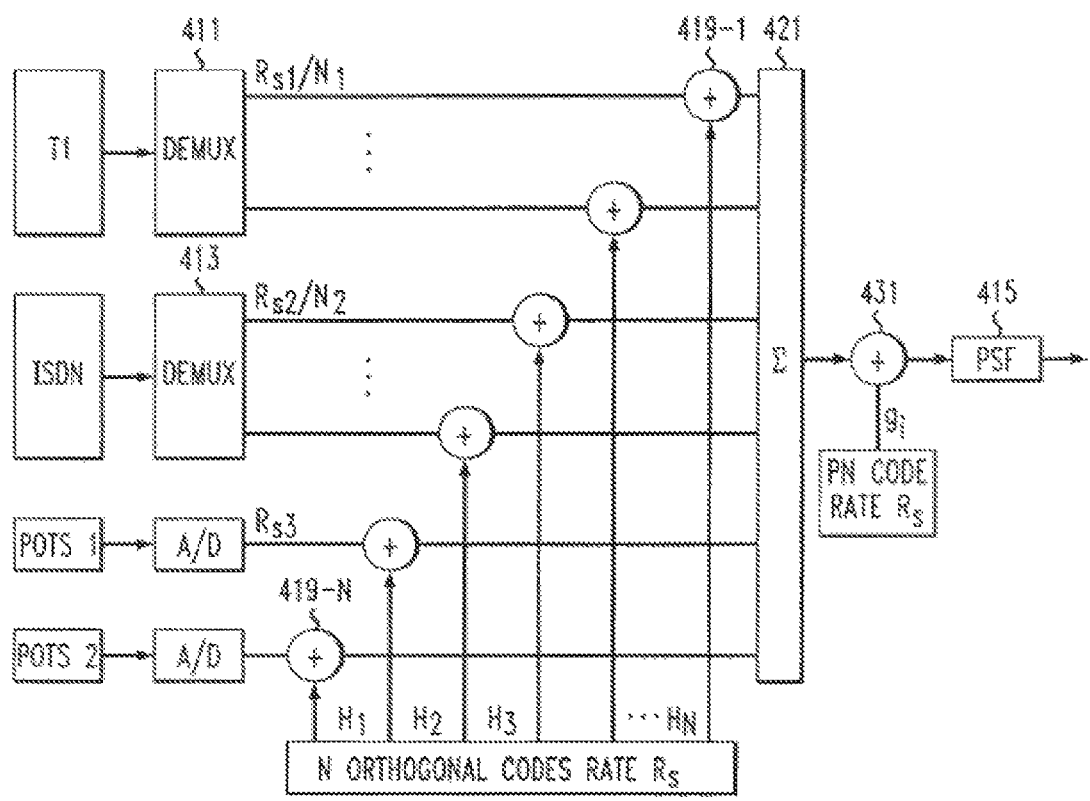
FIG. 4 is a block schematic of a service multiplexing circuit using orthogonal code multiplexing for providing T1, ISDN and POTS services over a twisted pair channel.

The OCDM system provides a method of code multiplexing a number of services for the twisted pair channel. Transmission circuitry suitable for this application is shown schematically in FIG. 4. As shown T1, ISDN, and POTS services are applied to an OCDM transmitter. T1 having a signal rate $R_{s1}$ is applied to a demultiplexer 411 and demultiplexed into $N_1$ parallel streams at rate $R_{s1}/N_1$. $R_{s2}$ is an ISDN signal demultiplexed by demultiplexer 413 and divided into parallel streams having the rate $R_{s2}/N_2$. POTs signals are converted from analog to digital having a race $R_{s3}$. All of the parallel streams are spread by N orthogonal codes with rate $R_s$, by mixers 419-N and applied to summing circuit 421, which combines all the streams into one stream. A PN cover code of rate $R_s$ is mixed, in mixer 431, with the summer output and the output is filtered with a power spectrum filter 415 to obtain a desired pulse shape. In this manner the provision of multiple services may be provided by code multiplexing.

System efficiency may be greatly enhanced by adaptive loading in which the dimension of modulation is changed, for various individual streams, to control the symbol signal bandwidth within a particular twisted pair channel. The input source data is divided into a number of parallel streams. Each stream is loaded with a different order of modulation. Each of the parallel streams is further demultiplexed into substreams following modulation which are spread and applied to another demultiplex step.

Figure 5:
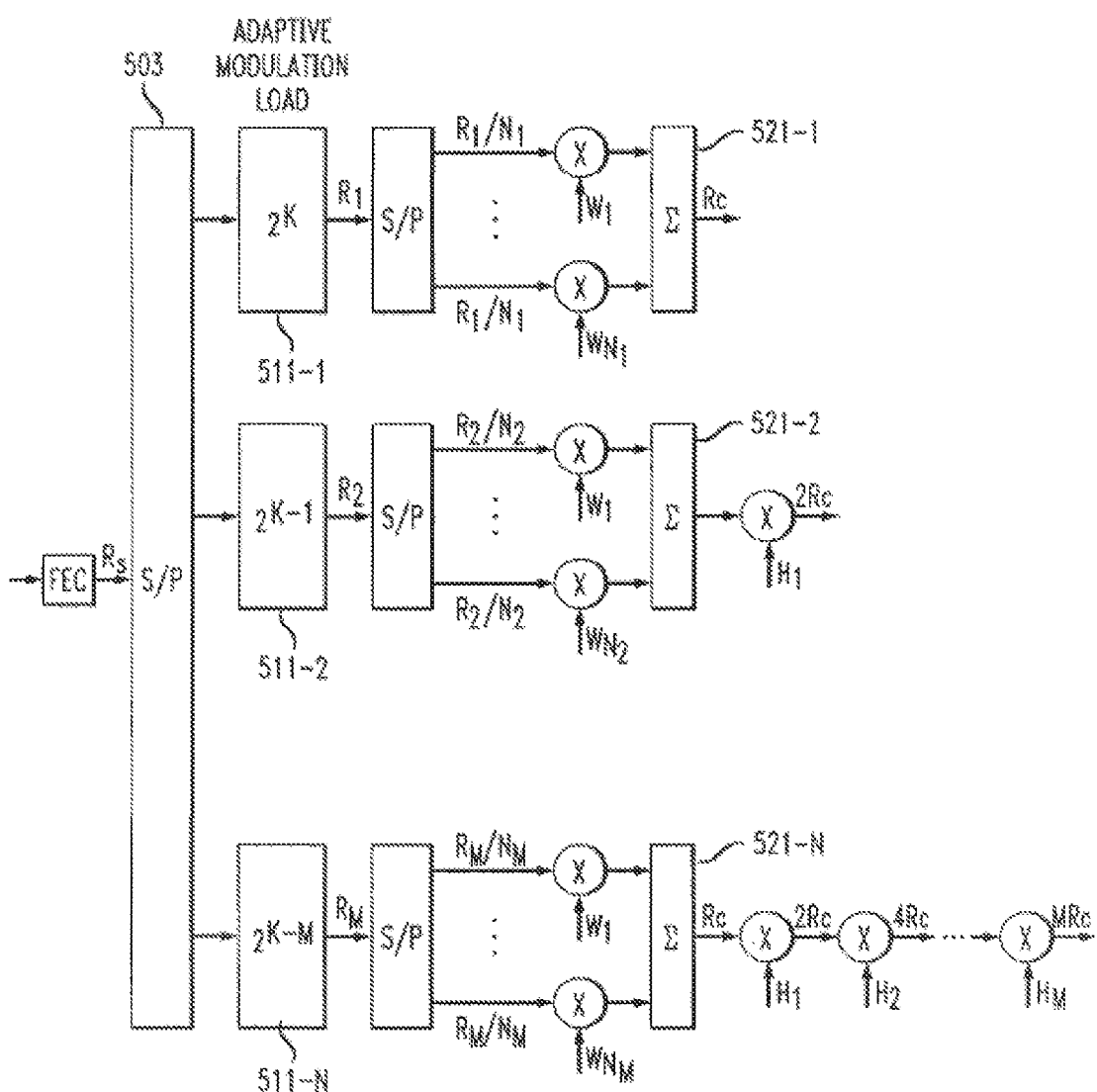
FIG. 5 is a block schematic of a generalized OCDM circuit using adaptive modulation to achieve a spectral density to match a twisted pair transfer function.

A fundamental circuit for distributing bandwidth of various portions of a serial stream to match a twisted pair transfer function is shown in the FIG. 5. A stream is introduced at FEC 501 serial to parallel converter 503 into parallel streams of rates $R_1$, $R_2$ and ending with $R_m$. Each of these streams is adaptively modulated (loaded) in the modulators 511-1, . . . , 511-N to achieve a particular bandwidth characteristic. The paralleled streams are further divided into paralleled substreams $R_1/N_1$ up to $R_m/N_m$, each of the substreams is mixed with Walsh codes $W_{N_M}$, and the multiple outputs of modulators 511-1, . . . , 511-N that are thus augmented are summed in summing circuits 521-1, . . . , 521-N, respectively. A first output on lead 525 is at rate $R_c$. The output of summing circuit 521-2 is mixed with the orthogonal code $H_1$ to achieve an output $2R_c$. The summing circuit 521-N output is multiply mixed with a series of orthogonal codes $H_1$, $H_2$, . . . $H_M$. This combination of mixing and modulation achieves a frequency distribution of the data rates of the incoming stream.

The substreams are spread by orthogonal codes with the code spreading creating bandwidths of different resulting power spectral densities that allow mixing and matching to provide a power spectra characteristic matching that of the twisted pair transfer function. A typical result is as shown in the graph of FIG. 7 wherein the individual power spectra distribution is shown for three data streams for rates of $R_c$, $2R_c$, $4R_c$ and $MR_c$ are shown by curves 701, 702, 703 and 704, respectively. The shape of each of these data streams is due to the pulse-shaping filter. All of the overlapping streams are orthogonal to one another. The sum of powers in each band is adjusted to achieve the desired cumulative effect of all streams in order to match the twisted pair power spectral characteristics. The modulation load is higher at the lower frequencies, which include the most useful channel capacity. It is readily apparent from the FIG. 7 graph that the cumulative effect of the different bands, created by adaptive modulation loading, $R_c$, $2R_c$, and $4R_c$ presents a cumulative component which approximates the transfer characteristic of the twisted pair as indicated by the line 705.

Figure 6A:
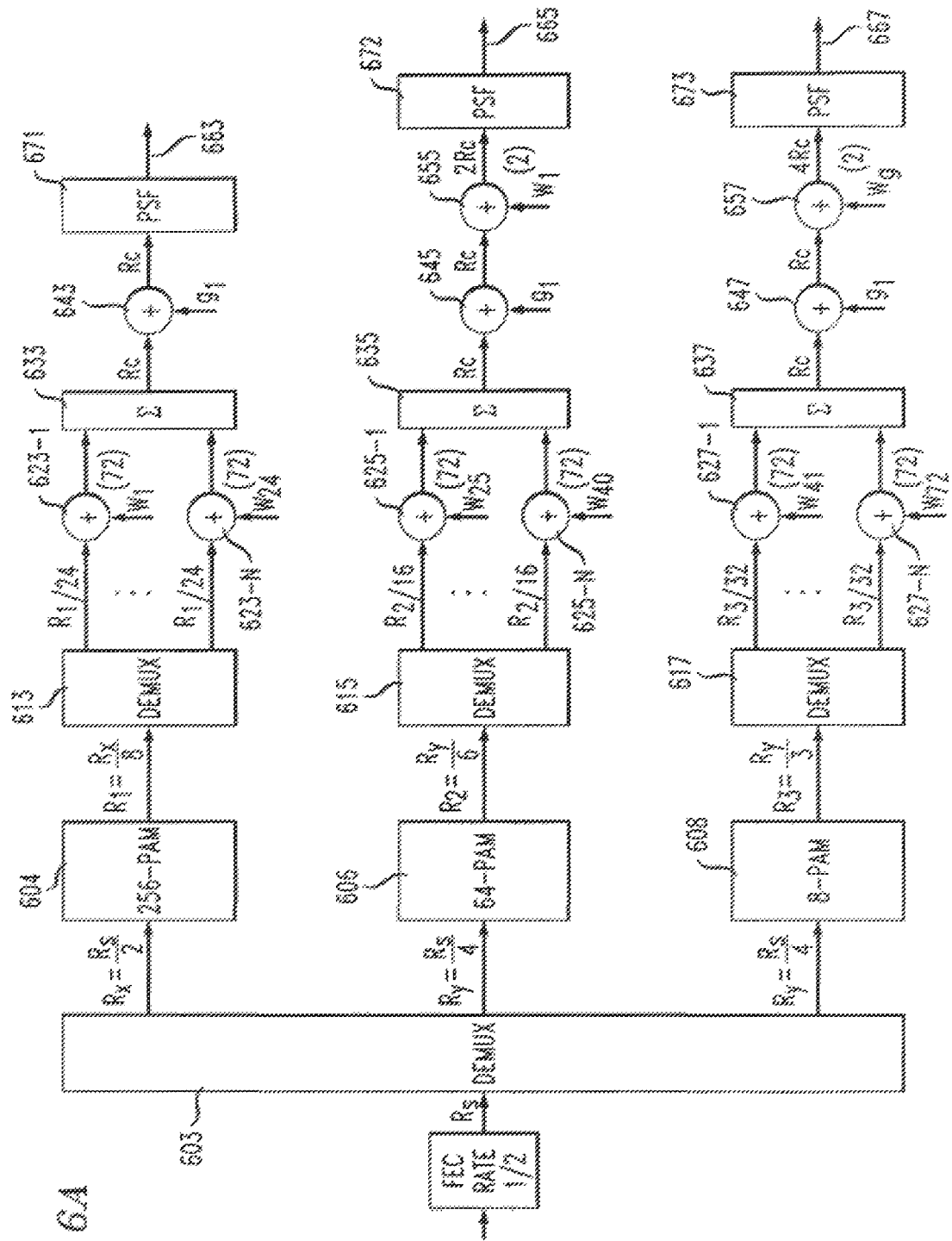
FIG. 6A is a block schematic of a particular example of an OCDM with adaptive loading of the modulation process to achieve a match of the transmitted data power spectra characteristic with that of the twisted pair.

Distribution of bandwidth by adaptive modulation is performed by transmitters, such as shown in FIG. 6A. FEC coded signals $R_s$, from FEC 602 are applied to a demultiplexer 603 generating outputs $R_x=R_s/3$, $R_y=R_s/4$ and $R_y=R_s/4$. These signals are modulated in 256-PAM, 64-PAM and 8-PAM modulators 604, 606 and 608, respectively. Each modulated stream is again demultiplexed by one of the demultiplexers 613, 615 and 617. Demultiplexer 613 generates an output of parallel streams having a rate of $R_1/24$. Demultiplexer 615 generates $R_2/16$ and Demultiplexer 617 generates an output of $R_3/32$.

All the demultiplexed signals are spread by mixers 623-1, . . . , 623-N, 625-1, . . . , 625-N and 627-1, . . . , 627-N and applied to summers 633, 635 and 637, respectively. Their respective outputs are cover coded by PN codes $g_i$ in mixers 643, 645 and 647. The output of mixer 643 is applied to power spectra filter 671, output of mixer 645 is spread with code $W_1$ in mixer 655 and applied to power spectra filter 672, and the output of mixer 647 is spread with coder $W_g$. The outputs of power spectra filters 671, 672 and 673 form the desired loading and bandwidth distribution at outputs 663, 665 and 667, respectively.

Figure 6B:
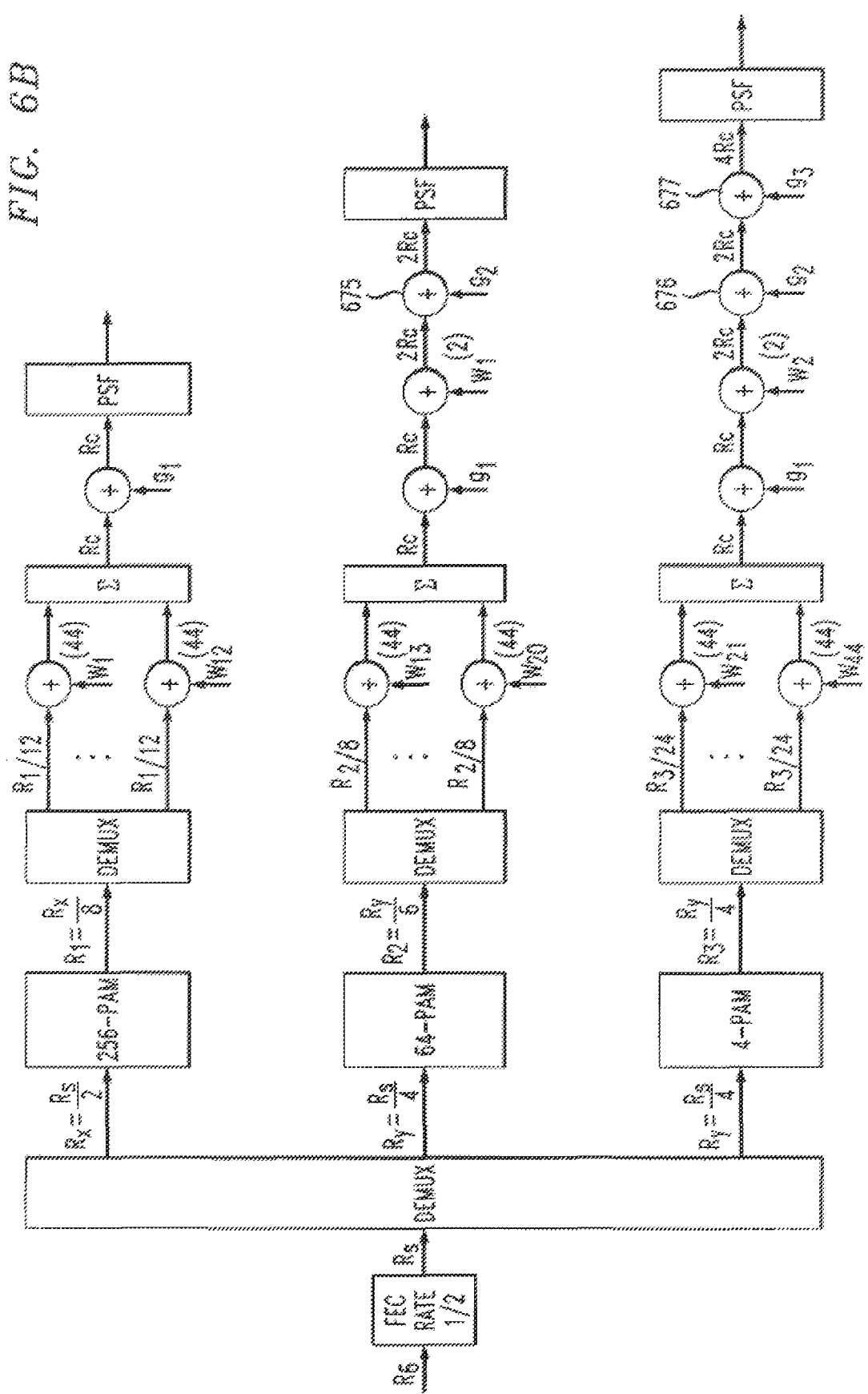
FIG. 6B is a block schematic of a particular example of an OCDM with adaptive loading of the modulation process.

A similar circuit in FIG. 6B is provided with additional mixers 675, 676 and 677 in the output to permit added overspreading of the output by codes $g_2$ and $g_3$. Overspreading as used herein means a re-spreading of a given spread signal of rate R with an orthogonal code having a rate which is an even integer multiple of the spread signal being overspread.

The adaptive loading produces a bandwidth distribution in which narrower spreading bandwidths have a higher order modulation and wider spreading bandwidths have a lower order modulation. As shown in the FIG. 7 graph the spreading bands have overlapping regions but the maintenance of orthogonality prevents significant interference. This approach satisfies the requirements needed for use of the water-pouring scheme which permits maximum utilization of the TPC capacity. Three data streams are shown in the graph and these bands are due to power spectra filtering. In the first frequency band $(0, R_c)$ three data spectra overlap. A second frequency band $(R_c, 2R_c)$ has two overlapping regions. By control of the sum of powers in each band the powers in each band may be regulated so that the overall sum of all the bands approximates the transfer characteristic of the twisted wire pair according to water pouring solutions. Water pouring allows matching of spectral energy with frequency. Both transmit power and pulse shape may be adjusted in each stream and the number of streams delineated may also be adjusted. Modulation loading is highest at lower frequencies where the most channel capacity is located.

Figure 8:
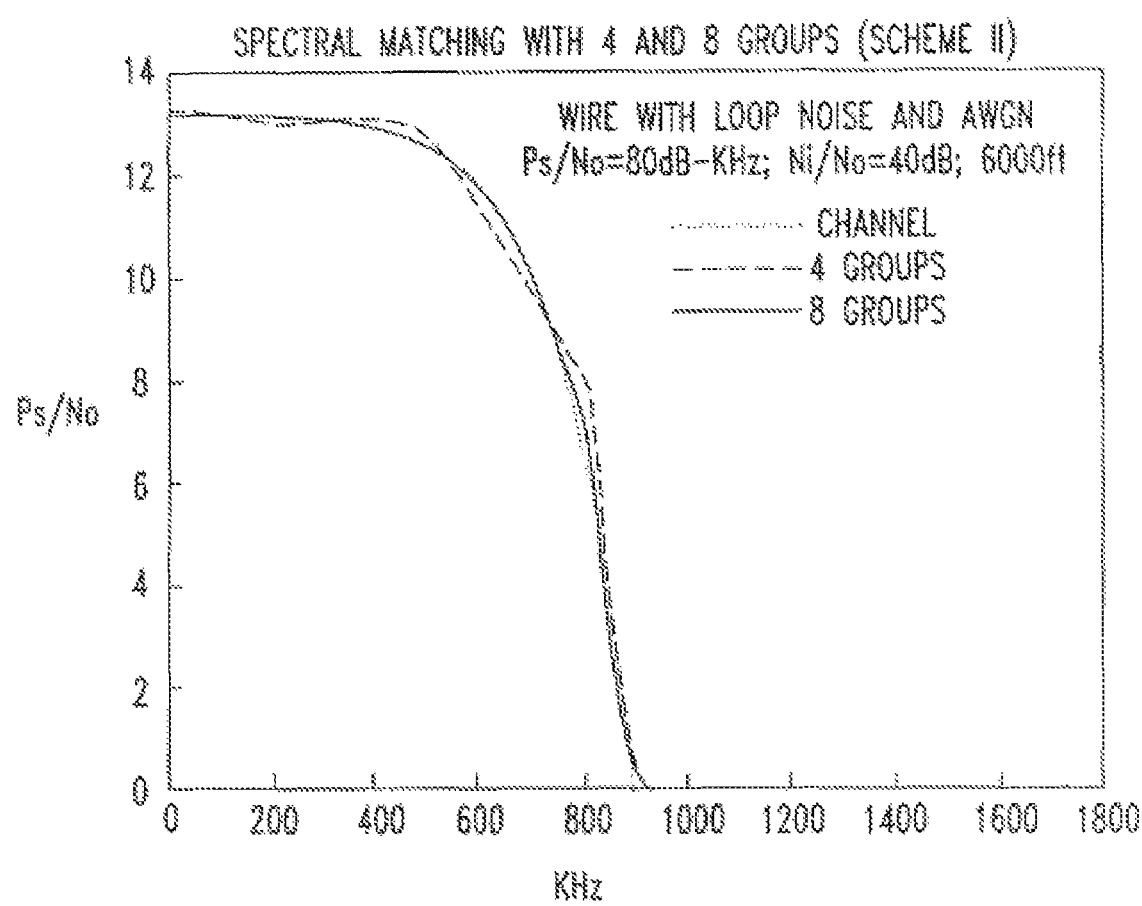
FIG. 8 is a graph of spectral matching OCDM with a twisted pair spectrum.

The graph of spectral matching versus frequency is shown in FIG. 8. As shown, the curves for the different groups are almost coincident with one another.

The invention claimed is:

1. A method for developing a signal adapted for transmission over a twisted pair wire comprising the steps of:
   accepting an incoming data flow from a plurality of sources where each of the sources $S_i$, i=1,2, . . . K, provides symbols at rate $R_i$ that is a multiple of rate $R_s$;
   splitting each flow $S_i$ into a number of parallel streams such that each of the parallel streams has a symbols rate of $R_s$, forming a total number of N streams from the splitting of all flows $S_i$;
   spreading each of the N streams with a different spreading code from an orthogonal code set on N codes;
   combining the spread signals;
   modifying an output signal that results from said combining by overspreading said output signal to form an overspread signal; and
   shaping said overspread signal to match a power spectrum of the shaped signal to a power transfer function of said twisted pair wire.

2. The method of claim 1 where said incoming data arrives to a single serial input.

3. The method of claim 1 where said incoming data arrives at a plurality of serial inputs, each carrying a signal of one or more of said sources.

4. The method of claim 1 where said incoming data is pulse amplitude modulated.

5. The method of claim 1 where said overspreading in said step of modifying is performed by multiplying said output signal with a signal that has the value +1 and −1.

6. The method of claim 1 where said sources are taken from a set that includes POTS signals, ISDN signals, and T1 signals.

7. A method for developing a signal adapted for transmission over a twisted-pair wire comprising the steps of:
accepting an incoming plurality of flows $S_i$, i=0,1, ... M, each having a data rate $R_i$ that is a multiple of rate $R_s$;
splitting a signal that is derived from each flow $S_i$, i=0, 1, ... M, into a set of $N_i$ parallel streams, $s_{ij}$, j=0,1, ... $N_i$, such that each of the parallel streams has a symbol rate of $R_s$, to form M sets of parallel streams;
relative to each set i, i=0,1, ... M, of said parallel streams, $s_{ij}$, j=0,1, ... $N_i$
spreading each stream with an orthogonal code taken from a given set of orthogonal codes, where the orthogonal code that spreads one stream is different from the orthogonal code that spreads another stream,
summing the spread streams to form a summed output stream $Q_i$ that has a rate $R_c$,
modifying output stream $Q_i$, said modifying including overspreading output stream $Q_i$ to form an overspread signal, and
shaping said overspread signal for application of the shaped overspread signal to said twisted-pair wire.

8. The method of claim 7 where symbols of the signal related to flow $S_i$, i=0,1, ... M, are created by encoding flow $S_i$ with a module that employs $2^{K-i}$-PAM modulation.

9. The method of claim 8 where said modifying output stream $Q_i$ for some value of i comprises additional spreading to form said overspread signal, said additional spreading provisioned to yield a higher rate of the overspread signal derived from $Q_i$ relative to the rate of the spread signal derived from $Q_j$, where j≠i.

10. Apparatus for developing a signal adapted for transmission over a twisted-pair wire comprising:
a first transmission processing circuitry section that includes
a first-section splitter responsive to a first incoming signal for developing a plurality of signals, each having a rate of $R_s$;
a first-section spreading module that spreads each of the streams developed by the first-section splitter with a spreading code from a chosen family of orthogonal codes, where the codes used for spreading the different streams in said first-section module are different from each other;
a first-section combiner that sums the spread signals generated by said first section spreading module, to form an output signal;
a first-section overspreading module for modifying the output signal created by said first-section combiner, said modifying includes overspreading said output signal with a chosen orthogonal code to form a first-section overspread signal; and
a first section power spectrum filter that shapes said first-section overspread signal for applying the shaped first-section overspread signal to said twisted-pair wire.

11. The apparatus of claim 10 further comprising one or more additional transmission processing circuitry sections i, i=2,3, ... M, where each transmission processing circuitry section i includes
an i-section splitter responsive to an $i^{th}$ incoming signal for developing a plurality of signals each having a rate of $R_s$;
an i-section spreading module that spreads each of the streams developed by the i-section splitter with a spreading code from said chosen family of orthogonal codes, where the codes used for spreading the different streams in said i-section module are different from each other;
an i-section combiner that sums the spread signals generated by said i-section spreading module to form an output signal;
an i-section overspreading module for modifying the output signal created by said i-section combiner, said modifying includes overspreading said output signal with a chosen orthogonal code of said family of orthogonal codes to form an i-section overspread signal; and
a combiner for summing the signals created by the M i-section overspreading modules, for application to said twisted-pair wire.

12. The apparatus of claim 11 where said combiner comprises M power spectrum filters, interposed between the signals created by M i-section overspreading modules and a summing element.

13. The apparatus of claim 11 further comprising a plurality of encoders i, i=1,2, ... M, for encoding an $i^{th}$ applied signal to form said $i^{th}$ incoming signal, where a modulation loading that is employed in each of said plurality of encoders i is different.

14. The apparatus of claim 13 where the modulation employed by each of said plurality of encoders i, i=1,2, ... M, is $2^{K-1-i}$-PAM, where K is a preselected integer.

15. The apparatus of claim 14 where said each i-section overspreading module includes an element for making the rate of the i-section overspread signal greater than the rate of the section i-1 overspread signal.

16. The apparatus of claim 14 further comprising:
a forward error correcting module responsive to a given signal; and
a splitter responsive to an output signal of said forward error correcting module for developing a first applied signal and a second applied signal.

17. The apparatus of claim 16 where said splitter is conditioned to create said first applied signal and said second applied signal with chosen data rates that are not constrained to be the same.

18. Apparatus for developing a signal adapted for transmission over a twisted pair wire comprising:
a plurality of transmission processing circuitry sections i, i=1,2, ... M, where each section i includes
an i-section encoder, responsive to an $i^{th}$ incoming signal, which employs a Pulse Amplitude Modulation (PAM) with an i-section modulation loading to develop a signal with a rate $R_i$ that is a multiple of rate $R_s$, where the i-section modulation loading is different from a j-section modulation loading, where j≠i, and where a high PAM modulation loading converts more bits into a pulse symbol than a low PAM modulation loading;

an i-section splitter responsive to encoded output of the i-section encoder for developing a plurality of signals each having a rate of $R_s$;

an i-section spreading module that spreads each of the streams developed by the i-section splitter with a spreading code, where the codes used for spreading the different streams in said i-section spreading module are different from each other;

an i-section combiner that sums the spread signals generated by said i-section spreading module to form an output signal; and an i-section overspreading module for modifying the output signal created by said i-section combiner, said modifying includes overspreading said output signal with an overspreading code such that the developed rate of said spread signal created by the i-section overspreading module is higher than the developed rate of said spread signal created by the j-section overspreading module when the PAM loading of the i-section encoder is lower than the PAM loading of the j-section encoder; and summing signals related to the overspread signals created by the M overspreading modules, for application to said twisted pair wire; where the codes used in the spreading modules and the overspreading codes used in the overspreading modules are mutually orthogonal to each other.

\* \* \* \* \*